(12) United States Patent
Geng et al.

(10) Patent No.: US 10,951,971 B2
(45) Date of Patent: Mar. 16, 2021

(54) HEADPHONE CHARGING CASE

(71) Applicants: Sihua Geng, Shenzhen (CN); Zhou Yi, Dongguan (CN); Jianfei Liu, Dongguan (CN); Sen Wang, Dongguan (CN)

(72) Inventors: Sihua Geng, Shenzhen (CN); Zhou Yi, Dongguan (CN); Jianfei Liu, Dongguan (CN); Sen Wang, Dongguan (CN)

(73) Assignee: Sharetronic Data Technology (Hong Kong) Limited, Hong Kong (CN)

( * ) Notice: Subject to any disclaimer, the term of this patent is extended or adjusted under 35 U.S.C. 154(b) by 0 days.

(21) Appl. No.: 16/691,213

(22) Filed: Nov. 21, 2019

(65) Prior Publication Data
US 2021/0006889 A1 Jan. 7, 2021

(51) Int. Cl.
| | | |
|---|---|---|
| *H04R 1/10* | (2006.01) |
| *H02J 7/00* | (2006.01) |
| *H01Q 1/27* | (2006.01) |
| *H01Q 1/24* | (2006.01) |

(52) U.S. Cl.
CPC .......... *H04R 1/1025* (2013.01); *H02J 7/0045* (2013.01); *H04R 1/1016* (2013.01); *H04R 1/1041* (2013.01); *H04R 1/1083* (2013.01); *H01Q 1/24* (2013.01); *H01Q 1/273* (2013.01); *H04R 2420/07* (2013.01); *H04R 2420/09* (2013.01)

(58) Field of Classification Search
CPC .. H04R 1/1025; H04R 1/1016; H04R 1/1083; H04R 1/1041; H04R 2420/07; H04R 2420/09; H02J 7/0042; H02J 7/0047; H02J 7/0048; H02J 7/0045; H01Q 1/243; H01Q 1/2291; H01Q 1/273
See application file for complete search history.

(56) References Cited

U.S. PATENT DOCUMENTS

| | | | |
|---|---|---|---|
| 7,272,421 B2 | 9/2007 | Bang et al. | |
| 7,859,469 B1 * | 12/2010 | Rosener | H01Q 1/22 343/702 |
| 7,925,296 B2 | 4/2011 | Lin | |
| 8,144,914 B2 | 3/2012 | Shi | |
| 8,145,283 B2 | 3/2012 | Shi | |
| 8,571,544 B2 | 10/2013 | Pelland et al. | |
| 8,655,420 B1 | 2/2014 | Pelland et al. | |
| 9,013,145 B2 | 4/2015 | Castillo et al. | |

(Continued)

FOREIGN PATENT DOCUMENTS

CN 208549003 U * 2/2019

*Primary Examiner* — Yogeshkumar Patel
(74) *Attorney, Agent, or Firm* — Joe Nieh

(57) ABSTRACT

The headphone charging case with communication functions comprises an earphone case, an antenna bracket affixed inside the earphone case, a WIFI antenna and an RF antenna are connected to the side of the antenna bracket, and a headphone disposed inside an earphone holder which is affixed to the antenna bracket. A lithium battery is disposed inside the earphone, and the bottom of the earphone is electrically connected with the lithium battery through a charging conductor. A motherboard and a rechargeable battery are affixed to the antenna holder, and a charging board is affixed on the main board. A pogopin charging contact is electrically connected to the charging board, and a Type-C charging port is fixed at the bottom of the main board.

8 Claims, 5 Drawing Sheets

(56) References Cited

U.S. PATENT DOCUMENTS

| | | |
|---|---|---|
| 9,049,502 B2 | 6/2015 | Pelland et al. |
| 9,438,987 B2 | 9/2016 | Koss et al. |
| 9,502,913 B2 | 11/2016 | Castillo et al. |
| 9,961,431 B2 | 5/2018 | McPeak et al. |
| 9,967,649 B2 | 5/2018 | Chandramohan et al. |
| 10,009,678 B2 | 6/2018 | Panecki et al. |
| 10,110,984 B2 | 10/2018 | Rich et al. |
| 10,123,104 B1 | 11/2018 | Shao |
| 10,182,282 B2 | 1/2019 | McPeak et al. |
| 10,225,637 B2 | 3/2019 | Panecki et al. |
| 2017/0195466 A1* | 7/2017 | Chen ................. H04M 1/72527 |
| 2018/0091884 A1* | 3/2018 | Minoo ................. H04R 1/1091 |
| 2018/0248406 A1* | 8/2018 | Bae ........................... H02J 7/00 |
| 2020/0107174 A1* | 4/2020 | Tong ................... H04R 1/1025 |

\* cited by examiner

HEADPHONE CHARGING CASE

BACKGROUND-FIELD OF INVENTION

The present invention relates to a headphone charging case. In particular, the present invention relates to an earphone charging case with communication functions.

BACKGROUND-DESCRIPTION OF RELATED ART

Wireless Bluetooth headsets include Bluetooth headsets and infrared headsets. Bluetooth headsets use Bluetooth technology on hands-free headsets, allowing users to avoid the annoying wires and freely move about. Since the advent of the Bluetooth headset, it has been a popular product to increase the efficiency of mobile business people.

Bluetooth was originally developed by Ericsson, Nokia, IBM, Intel, Toshiba, and CEIEC. It is a communication interface for short-distance wireless transmission. The basic communication distance is about 10 meters, the transmission rate is about 721 kbps, and it operates at a frequency of 2.4 GHz. It supports one-to-many data transmission and voice communication. Since Bluetooth is not designed to carry large traffic loads, it is not a replacement for LAN or WAN.

In the existing TWS earphones, the earphone charging case only has a simple charging function, resulting in a single function, which cannot meet the increasingly wide use requirements of users.

BRIEF SUMMARY OF THE INVENTION

A headphone charging case with communication functions, comprising an earphone case, wherein an antenna bracket is fixedly mounted on the earphone case. A WIFI antenna and a radio frequency antenna are connected to the side of the antenna bracket, and an earphone holder is fastened on the antenna bracket. An earphone is disposed inside the earphone holder, and the inside of the earphone holder is provided with a placement channel that cooperates with the earphone. A magnet for attracting the earphone is fixed on an inner wall of the placement channel. A lithium battery is disposed inside the earphone. The bottom of the earphone is provided with a charging conductor electrically connected to the lithium battery.

A motherboard and a rechargeable battery are affixed to the outside of the earphone holder, and a charging board is affixed on the motherboard. The charging board is electrically connected with a pogopin charging contact, and a Type-C charging port is affixed on the bottom of the motherboard. The top of the earphone case is hinged to the upper cover through a hinge bracket.

A baseband processor is affixed inside the earphone case. The baseband processor is connected to a radio frequency processor for transmitting a baseband signal, and the baseband processor is also connected to the rechargeable battery through a power management module. The baseband processor is also electrically connector to the sensor, memory, Bluetooth module, WIFI module, and GPS module.

The earphone is internally provided with a Bluetooth module and an MCU. The MCU is connected to a microphone MIC for audio input, and the MCU is also connected to a speaker for audio output, and the MCU is connected to the lithium battery through a power management module.

The front end of the antenna bracket is provided with an opening, the earphone bracket is engaged at the opening, and the height of the earphone bracket is shorter than the height of the opening.

The charging board extends into an opening at the front end of the antenna holder, and the charging plate is located between the bottom of the earphone holder and the bottom of the opening.

After the earphone is placed in a placement channel inside the earphone holder, it will be affixed by the magnet. The charging conductor at the bottom of the earphone is in contact with the pogopin charging contact.

The rechargeable battery is electrically connected to the charging board and the Type-C charging port.

Preferably, a power button is disposed on a side of the motherboard.

The radio frequency processor is connected to the radio frequency antenna. The WIFI module is connected to the WIFI antenna. In the preferred embodiment, the WIFI module uses KB3077, the Bluetooth module uses a BT-210 wireless Bluetooth module. In the preferred embodiment, the baseband processor uses Balong 5000, the RF processor uses RFM119 radio frequency transmitting module, and the controller and the MCU uses LPC5500.

The headphone charging case with communication functions realizes communication between the earphone and the earphone case through the Bluetooth module, and integrates Bluetooth communication and WIFI communication, baseband communication, and headset charging in a small space inside the earphone case. It can access the cloud server through baseband communication, and, through interaction with the Internet, achieve linkage control of the smart home. It effectively expands the use of headphones and headset charging case.

DETAILED DESCRIPTION OF THE PREFERRED EMBODIMENT

The following description and figures are meant to be illustrative only and not limiting. Other embodiments of this invention will be apparent to those of ordinary skill in the art in view of this description.

Figure 1:
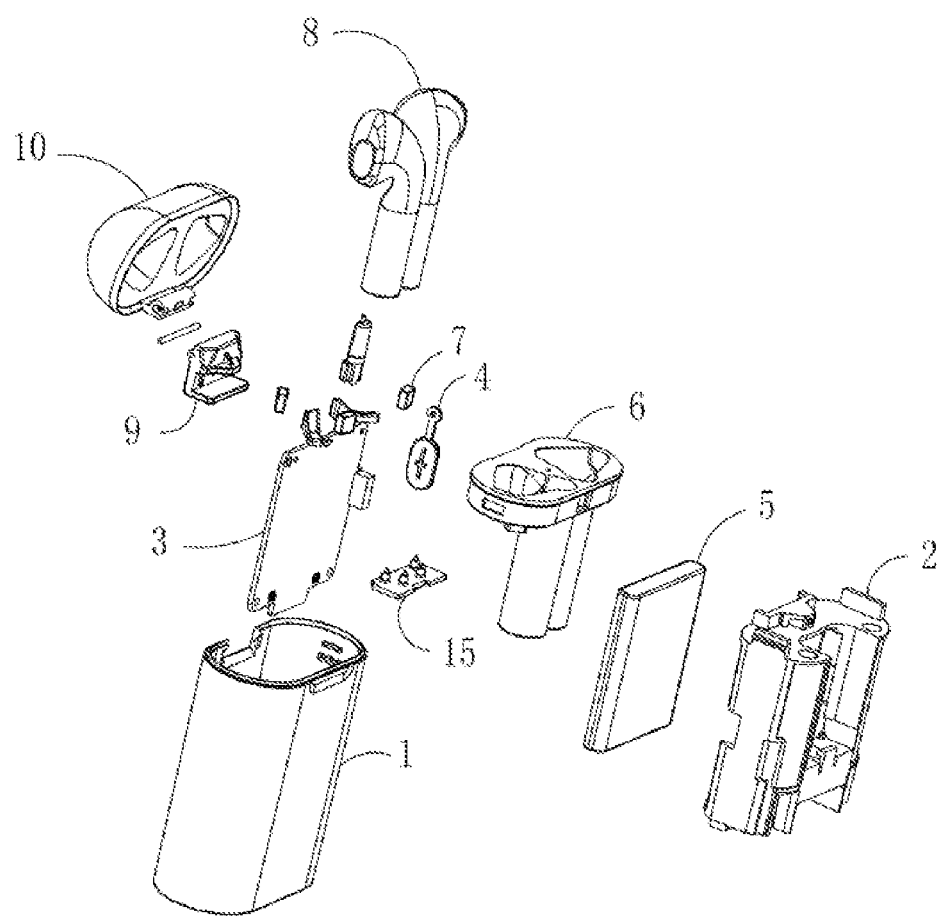
FIG. 1 shows exploded view of the structure of the present invention.
Figure 2:
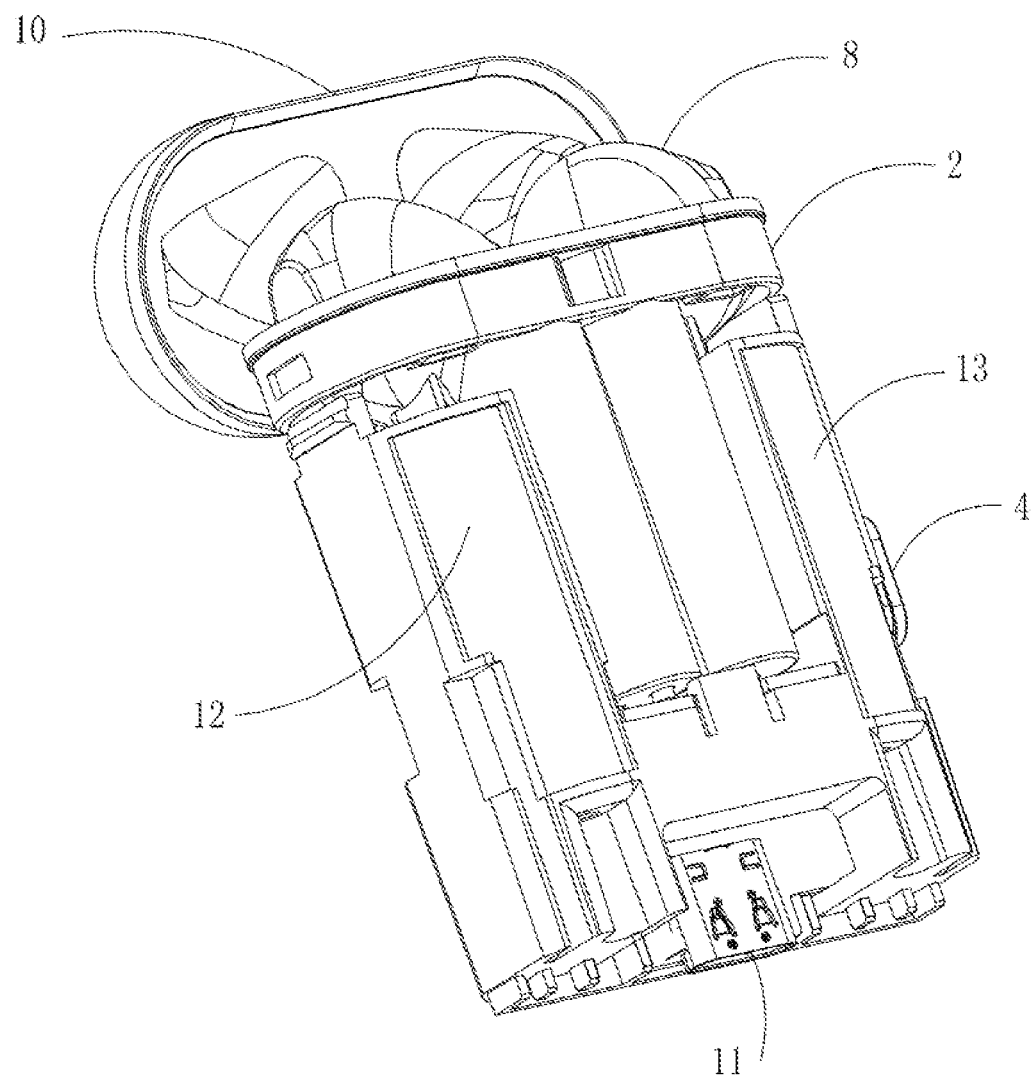
FIG. 2 shows the internal structure of the front side of the earphone case of FIG. 1.
Figure 3:
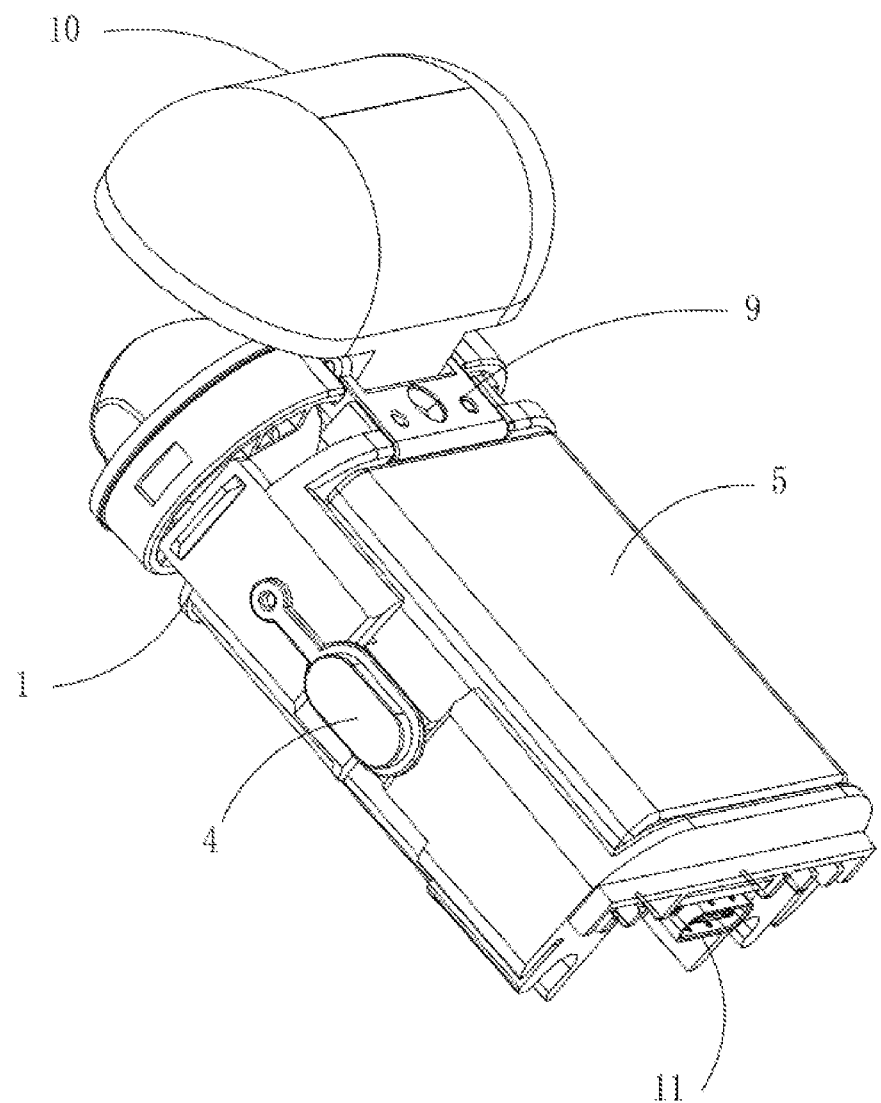
FIG. 3 shows the internal structure of the back side of the earphone case of FIG. 1.
Figure 4:
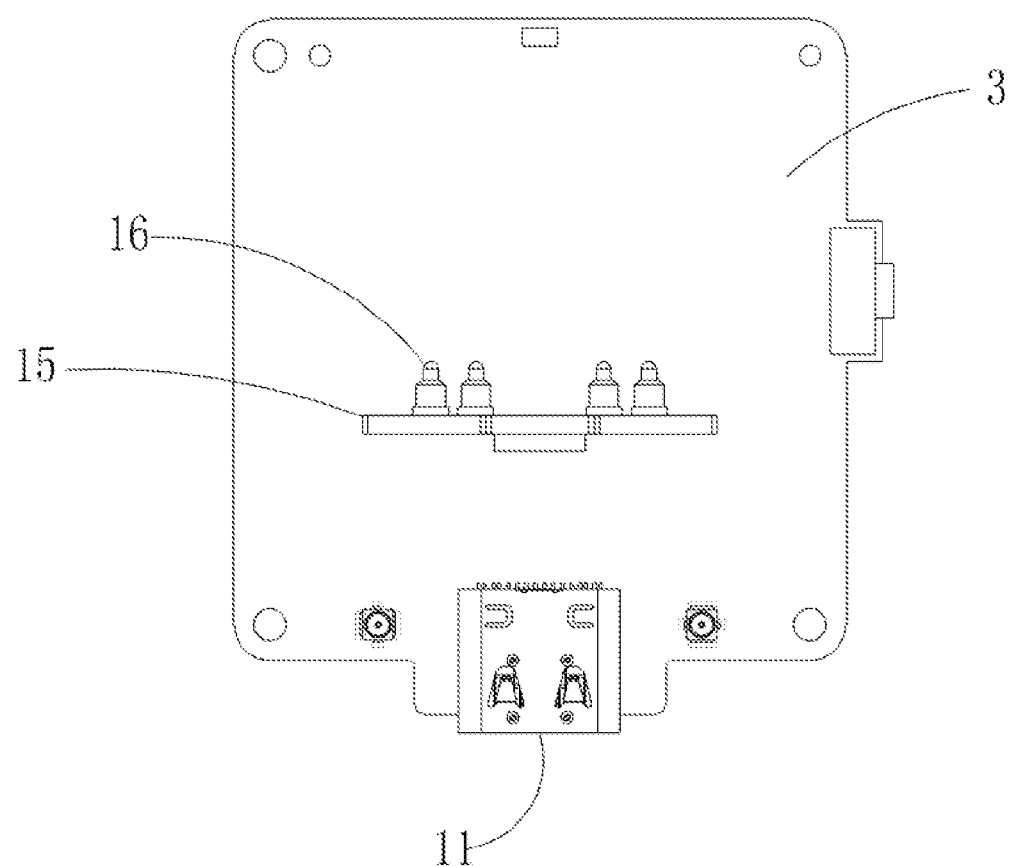
FIG. 4 shows the motherboard of FIG. 1.
Figure 5:
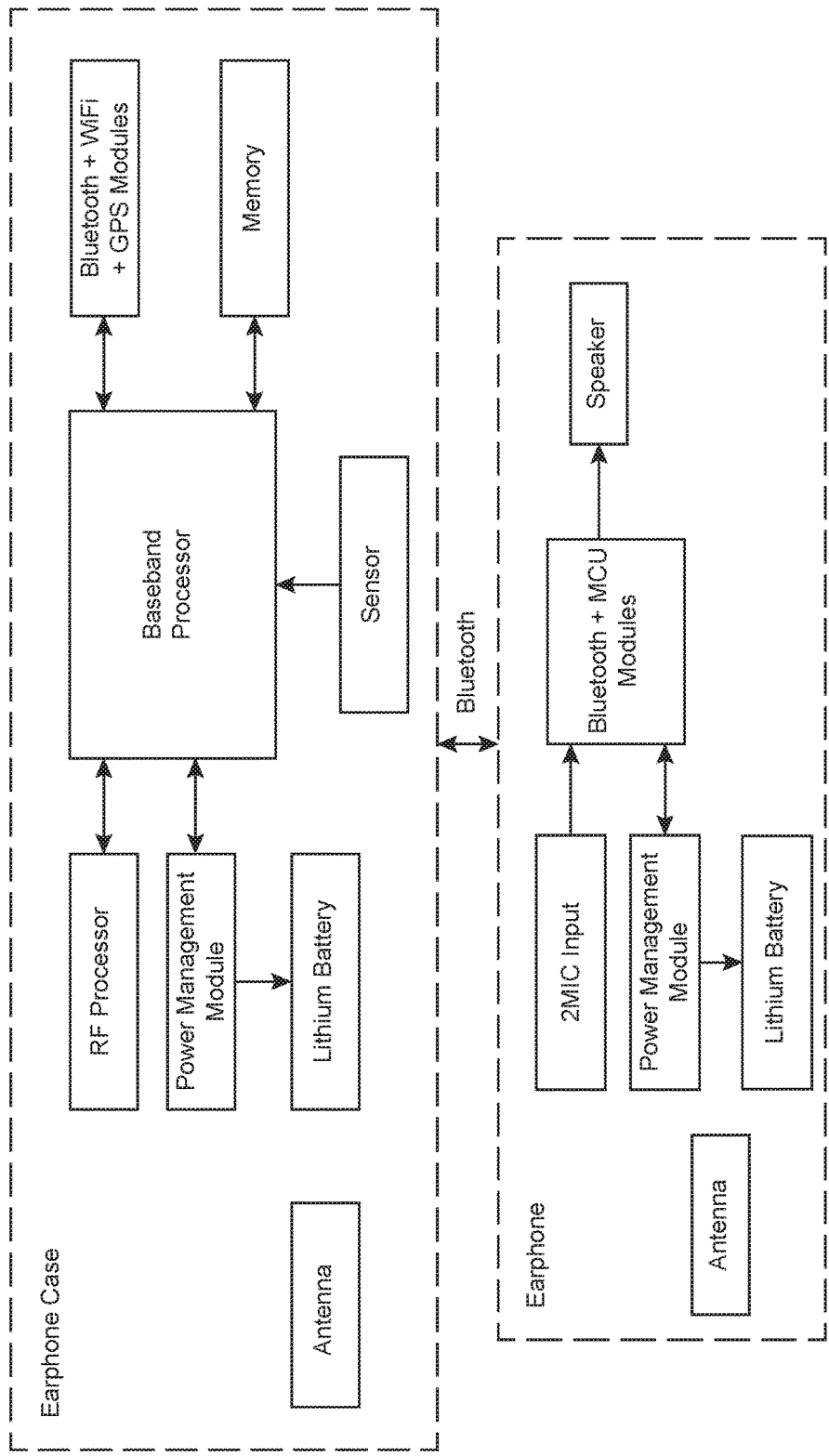
FIG. 5 shows the internal system of the earphone case and the earphone of the present invention.

A headphone device having a communication function, as shown in FIG. 1 to FIG. 5, includes an earphone case 1. An antenna bracket 2 is affixed inside the earphone case 1, and a side of the antenna bracket 2 is affixed with a WIFI antenna 12 and an RF antenna 13. The earphone holder 6 is affixed to the antenna bracket 2. The earphone 8 is placed inside the earphone holder 6. The inside of the earphone holder 6 is provided a placement channel that receives the earphone 8. The inner wall of the placement channel is provided with a magnet 7 for attracting the earphone 8. The earphone 8 encloses a lithium battery near its bottom, and a charging conductor electrically connected to the lithium battery is positioned at the bottom of the earphone 8.

A motherboard 3 and a rechargeable battery 5 are affixed to the antenna bracket 2. A charging board 15 is affixed on the motherboard 3. A pogopin charging contact 16 is electrically connected to the charging board 15, and a Type-C charging port 11 is affixed on the bottom of the motherboard 3. The top of the earphone case 1 is hinged to the upper cover 10 through the hinge bracket 9.

The earphone case 1 is provided with a baseband processor inside. The baseband processor is connected to a radio frequency processor for transmitting baseband signals. The baseband processor is also connected to the rechargeable battery 5 through a power management module. The baseband processor is further connected to a sensor, a memory, a Bluetooth module, a WIFI module, and a GPS module.

The earphone 8 is internally provided with a Bluetooth module and an MCU. The MCU is connected to a microphone MIC for audio input, and also connected to a speaker for audio output. The MCU is also connected to the lithium battery through a power management module.

The front end of the antenna bracket 2 is provided with an opening, and the earphone holder 6 is affixed at the opening. The height of the earphone holder 6 is shorter than the height of the opening.

The charging board 15 extends into the opening at the front end of the antenna bracket 2, and the charging board 15 is located between the bottom of the headphone holder 6 and the bottom of the opening.

The earphone 8 is placed in the placement channel inside the earphone holder 6, and after being affixed by the magnet 7, the charging conductor at the bottom of the earphone 8 is in contact with the pogopin charging contact 16.

The rechargeable battery 5 is electrically connected to the charging board 15 and the Type-C charging port 11.

A power button 4 is provided on the side of the motherboard 3.

The RF processor is connected to the RF antenna 13. The WIFI module is connected to the WIFI antenna 12. In the preferred embodiment, the WIFI module uses KB3077, the Bluetooth module uses the BT-210 wireless Bluetooth module, the baseband processor uses the Balong 5000, the RF processor uses the RFM119 RF transmission module, and the MCU uses LPC5500.

The Bluetooth module in the earphone case 1 and the Bluetooth module in the earphone 8 are both BT-210 wireless Bluetooth modules. The communication between the earphone 8 and the earphone box 1 is enabled by the Bluetooth modules. The Bluetooth communication, WIFI communication, baseband communication, earphone charging, and other functions are all integrated into a small space inside the earphone case. Cloud server access is enabled through baseband communication to control the smart home through interaction with the Internet.

An eSIM is provided in the earphone case 1, and it enables the earphone 8 to place and receive phone calls. The microphone MIC gathers sound and enables noise suppression, enables inputting command into the memory, and forms a voice command code, thereby enable voice command of the earphone 8 without the necessity of a mobile phone. The sensor inside the earphone case 1 is used for function expansion with sensors selected to perform the desired function.

The front end of the antenna bracket 2 is provided with an opening. The earphone holder 6 is affixed at the opening, and the height of the earphone holder 6 is shorter than the height of the opening. The charging board 15 extends into the opening of the front end of the antenna bracket 2, and the charging board 15 is positioned between the bottom of the earphone holder 6 and the bottom of the opening.

The earphone 8 is placed in the placement channel inside the earphone holder 6, and after being affixed by the magnet 7, the charging conductor at the bottom of the earphone 8 will be in contact with the pogopin charging contact 16, and the lithium battery in the earphone 8 is charged by the rechargeable battery 5.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof

What is claimed is:

1. A headphone charging case comprising:
    an earphone case wherein an antenna bracket is affixed to the inside of the earphone case,
    a WIFI antenna is affixed to the antenna bracket inside the earphone case,
    an RF antenna is affixed to the antenna bracket inside the earphone case,
    an earphone bracket is affixed on the antenna bracket,
    an earphone disposed inside the earphone bracket,
    a placement channel is provided in the earphone bracket to receive said earphone,
    a magnet is affixed to an inner wall of the placement channel for attracting the earphone,
    a lithium battery is disposed inside said earphone,
    a charging conductor is provided at the bottom of the earphone and electrically connected to the lithium battery,
    a motherboard and a rechargeable battery are fixed to the antenna bracket,
    a charging board is affixed on the motherboard,
    a pogopin charging contact is electrically connected to the charging board,
    a Type-C charging port is affixed to the bottom of the motherboard,
    the top of the earphone case is connected to an upper cover with a hinge,
    a baseband processor is provided inside said earphone case, said baseband processor is connected to a radio frequency processor inside said earphone case for transmitting a baseband signal, and said baseband processor is connected to a rechargeable battery through a power management module,
    said baseband processor is further connected to a sensor, a memory, a Bluetooth module, a WIFI module, and a GPS module inside said earphone case,
    said earphone is internally provided with a Bluetooth module and an MCU, the MCU is connected to a microphone MIC for audio input, the MCU is connected to a speaker for audio output, and the MCU is connected to the lithium battery through the power management module.

2. A headphone charging case as in claim 1, wherein the front end of the antenna bracket is provided with an opening, the earphone holder is affixed at the opening, and the height of the earphone holder is shorter than the height of the opening.

3. A headphone charging case as in claim 1, wherein the charging board extends into an opening at the front end of the antenna bracket, and the charging board is positioned between the bottom of the earphone holder and the bottom of the opening.

4. A headphone charging case as in claim 1, wherein the earphone is disposed in a placement channel inside the earphone holder and is affixed by the magnet and the charging conductor at the bottom of the earphone is in contact with the pogopin charging contact.

5. A headphone charging case as in claim 1, wherein the rechargeable battery is electrically connected to the charging board and the Type-C charging port.

6. A headphone charging case as in claim 1, wherein a power supply button is disposed on the side of the motherboard.

7. A headphone charging case as in claim 1, wherein the radio frequency processor is connected to the radio frequency antenna, and the WIFI module is connected to the WIFI antenna.

8. A headphone charging case as in claim 7, wherein the WIFI module is KB3077, the Bluetooth module is BT-210 wireless Bluetooth module, the baseband processor is Balong 5000, the radio frequency processor is RFM119 radio frequency transmitting module, and the MCU is LPC5500.

\* \* \* \* \*